(12) United States Patent
Pellizzari

(10) Patent No.: US 8,502,064 B2
(45) Date of Patent: *Aug. 6, 2013

(54) HYBRID SYSTEM FOR GENERATING POWER

(75) Inventor: Roberto Pellizzari, Groton, MA (US)

(73) Assignee: Philip Morris USA Inc., Richmond, VA (US)

( * ) Notice: Subject to any disclaimer, the term of this patent is extended or adjusted under 35 U.S.C. 154(b) by 1359 days.

This patent is subject to a terminal disclaimer.

(21) Appl. No.: 10/732,646

(22) Filed: Dec. 11, 2003

(65) Prior Publication Data

US 2005/0126624 A1 Jun. 16, 2005

(51) Int. Cl.
*H01L 31/00* (2006.01)

(52) U.S. Cl.
USPC .......................................... 136/253

(58) Field of Classification Search
USPC ......... 429/13, 33; 431/3, 11; 180/60; 123/98, 123/549

See application file for complete search history.

(56) References Cited

U.S. PATENT DOCUMENTS

| | | | |
|---|---|---|---|
| 2,404,335 | A | 7/1946 | Whittle |
| 3,716,416 | A | 2/1973 | Adlhart et al. |
| 3,868,939 | A | 3/1975 | Friese et al. |
| 3,947,228 | A | 3/1976 | Stenlund |
| 4,013,396 | A | 3/1977 | Tenney |
| 4,067,191 | A | 1/1978 | Gronvall et al. |

(Continued)

FOREIGN PATENT DOCUMENTS

| | | |
|---|---|---|
| DE | 3413377 | 10/1985 |
| DE | 3516410 | 11/1986 |

(Continued)

OTHER PUBLICATIONS

Toshiharu Monai et al., "Response Characteristics and Operating Methods of New Type Dispersed Power Supply System using Photovoltaic, Fuel Cell and SMES", IEEE Power Engineering Society Summer Meeting, vol. 2, pp. 874-879, 2002 (published in Dec. 2002).

(Continued)

*Primary Examiner* — Jennifer Michener
*Assistant Examiner* — Dustin Q Dam
(74) *Attorney, Agent, or Firm* — Roberts Mlotkowski Safran & Cole, P.C.

(57) ABSTRACT

A hybrid system for generating electrical power. The hybrid system includes a photovoltaic array for collecting and converting solar radiation into electrical power, an apparatus for producing power from a source of liquid fuel, the apparatus including at least one capillary flow passage, the at least one capillary flow passage having an inlet end and an outlet end, the inlet end in fluid communication with the source of liquid fuel, a heat source arranged along the at least one capillary flow passage, the heat source operable to heat the liquid fuel in the at least one capillary flow passage to a level sufficient to change at least a portion thereof from a liquid state to a vapor state and deliver a stream of substantially vaporized fuel from the outlet end of the at least one capillary flow passage, a combustion chamber in communication with the outlet end of the at least one capillary flow passage and a conversion device operable to convert heat released by combustion in the combustion chamber into electrical power, and a storage device electrically connected to the photovoltaic array and the conversion device for storing the electrical power produced by the photovoltaic array and the conversion device.

20 Claims, 8 Drawing Sheets

U.S. PATENT DOCUMENTS

| | | | | |
|---|---|---|---|---|
| 4,152,824 | A | 5/1979 | Gonsiorawaski | |
| 4,193,755 | A | 3/1980 | Guarnaschelli et al. | |
| 4,230,448 | A | 10/1980 | Ward et al. | |
| 4,239,555 | A | 12/1980 | Scharlack et al. | |
| 4,262,482 | A | 4/1981 | Roffe et al. | |
| 4,277,942 | A | 7/1981 | Egnell et al. | |
| 4,320,180 | A | 3/1982 | Nozaki | |
| 4,344,404 | A | 8/1982 | Child et al. | |
| 4,352,269 | A | 10/1982 | Dineen | |
| 4,384,457 | A | 5/1983 | Harvey | |
| 4,392,350 | A | 7/1983 | Marks | |
| 4,451,969 | A | 6/1984 | Chaudhuri | |
| 4,455,839 | A | 6/1984 | Wuchter | |
| 4,462,376 | A * | 7/1984 | Ripper et al. | 123/676 |
| 4,472,133 | A * | 9/1984 | Petersen et al. | 431/3 |
| 4,472,134 | A | 9/1984 | Ettman | |
| 4,515,555 | A | 5/1985 | Petersen et al. | |
| 4,595,790 | A | 6/1986 | Basol | |
| 4,638,172 | A | 1/1987 | Williams | |
| 4,677,958 | A | 7/1987 | Gayler | |
| 4,684,341 | A * | 8/1987 | Kawamura et al. | 431/242 |
| 4,784,599 | A | 11/1988 | Garbo | |
| 4,851,308 | A | 7/1989 | Akhtar | |
| 4,873,826 | A * | 10/1989 | Dhar | 60/641.14 |
| 4,986,248 | A | 1/1991 | Kobayashi et al. | |
| 4,989,561 | A * | 2/1991 | Hein et al. | 123/198 A |
| 5,101,634 | A | 4/1992 | Batakis et al. | |
| 5,127,822 | A | 7/1992 | Nakayama et al. | |
| 5,220,794 | A | 6/1993 | Sledd et al. | |
| 5,472,645 | A | 12/1995 | Rock et al. | |
| 5,512,109 | A | 4/1996 | Frass et al. | |
| 5,563,368 | A | 10/1996 | Yamaguchi | |
| 5,753,050 | A | 5/1998 | Charachi et al. | |
| 5,793,119 | A | 8/1998 | Zinke | |
| 5,836,150 | A | 11/1998 | Garcia | |
| 5,858,568 | A * | 1/1999 | Hsu et al. | 429/13 |
| 5,874,798 | A | 2/1999 | Wiegele et al. | |
| 5,917,144 | A | 6/1999 | Miyake et al. | |
| 5,921,764 | A | 7/1999 | Marchionna et al. | |
| 5,932,885 | A | 8/1999 | DeBellis et al. | |
| 5,932,940 | A | 8/1999 | Epstein et al. | |
| 6,077,722 | A | 6/2000 | Jansen et al. | |
| 6,092,912 | A | 7/2000 | Nelson | |
| 6,095,436 | A | 8/2000 | Seegers et al. | |
| 6,102,687 | A | 8/2000 | Butcher et al. | |
| 6,109,222 | A | 8/2000 | Gleezer et al. | |
| 6,111,189 | A | 8/2000 | Garvison et al. | |
| 6,172,427 | B1 | 1/2001 | Shinohara et al. | |
| 6,198,038 | B1 | 3/2001 | Shukla et al. | |
| 6,204,442 | B1 | 3/2001 | Laqua | |
| 6,276,347 | B1 * | 8/2001 | Hunt | 123/549 |
| 6,347,936 | B1 | 2/2002 | Young et al. | |
| 6,368,892 | B1 | 4/2002 | Arya | |
| 6,390,076 | B2 | 5/2002 | Hunt | |
| 6,423,565 | B1 | 7/2002 | Barth et al. | |
| 6,465,724 | B1 | 10/2002 | Garvison et al. | |
| 6,585,509 | B2 * | 7/2003 | Young et al. | 431/11 |
| 6,705,081 | B2 | 3/2004 | Kamen et al. | |
| 6,779,513 | B2 | 8/2004 | Pellizzari et al. | |
| 6,820,627 | B1 * | 11/2004 | Cordova | 134/110 |
| 6,871,792 | B2 | 3/2005 | Pellizzari | |
| 7,177,535 | B2 * | 2/2007 | Pellizzari et al. | 392/478 |
| 2003/0056791 | A1 * | 3/2003 | Nichols et al. | 128/203.16 |
| 2003/0177768 | A1 * | 9/2003 | Pellizzari | 60/737 |

FOREIGN PATENT DOCUMENTS

| | | |
|---|---|---|
| DE | 3719234 | 12/1988 |
| DE | 4036176 | 6/1992 |
| EP | 0 905 447 | 3/1999 |
| FR | 1458545 | 3/1966 |
| GB | 1125085 | 8/1968 |
| JP | 04311655 A | 4/1992 |
| JP | 05-263726 A | 10/1993 |
| JP | 2002-281568 A | 9/2002 |
| JP | 2002-135979 A | 10/2002 |
| JP | 2002-256883 A | 11/2002 |
| JP | 2002-372193 A | 12/2002 |
| WO | 03083283 | 10/2003 |
| WO | 03083367 | 10/2003 |

OTHER PUBLICATIONS

International Search report PCT/US2003/039327 Dated Oct. 21, 2005.

Wichert et al., "Development of a Test Facility for Photovoltaic-diesel Hybrid Energy Systems", Renewable Energy, Pergamon Press, Jan. 2001, vol. 22, No. 1-3, pp. 311-319, Oxford, GB.

Zahran et al., "P-Controller Based Photovoltaic Battery Diesel (PVDB) Hybrid System Management and Control", Energy Conversion Engineering Conference and Exhibit, Jul. 2000, vol. 2, pp. 1513-1521, Piscataway, NJ.

* cited by examiner

HYBRID SYSTEM FOR GENERATING POWER

BACKGROUND

The need to power electronics equipment, communications gear, medical devices and other equipment in remote field service has been on the rise in recent years, increasing the demand for highly efficient, mobile power systems. These applications require power sources that provide both high power and energy density, while also requiring minimal size and weight, low emissions and cost.

To date, batteries have been the principal means for supplying portable sources of power. However, due to the time required for recharging, batteries have proven inconvenient for continuous use applications. Moreover, portable batteries are generally limited to power production in the range of several milliwatts to a few watts and thus cannot address the need for significant levels of mobile, lightweight power production.

Small generators powered by internal combustion engines, whether gasoline- or diesel-fueled have also been used. However, the noise and emission characteristics of such generators have made them wholly unsuitable for a wide range of mobile power systems and unsafe for indoor use. While conventional heat engines powered by high energy density liquid fuels offer advantages with respect to size, thermodynamic scaling and cost considerations have tended to favor their use in larger power plants.

Photovoltaic and thermoelectric generators are the only commercially available energy conversion technologies below 2 kilowatts. While the benefits of photovoltaic are clear, the drawbacks are obvious. With respect to thermoelectric generators, they tend to be large, expensive and relatively inefficient.

In view of these factors, a void exists with regard to power systems in the size range of approximately 50 to 2000 watts. Moreover, in order to take advantage of high energy density liquid fuels, improved fuel preparation and delivery systems capable of low fueling rates are needed. Additionally, such systems must also enable highly efficient combustion with minimal emissions. A quiet, clean power source below 2 kilowatts could advantageously supplement current technologies, such as those based on photovoltaic arrays, and yield an advantageous hybrid system for generating electrical power.

SUMMARY

Disclosed herein is a hybrid system for generating electrical power. The hybrid system includes a photovoltaic array for collecting and converting solar radiation into electrical power, an apparatus for producing power from a source of liquid fuel, the apparatus including at least one capillary flow passage, the at least one capillary flow passage having an inlet end and an outlet end, the inlet end in fluid communication with the source of liquid fuel, a heat source arranged along the at least one capillary flow passage, the heat source operable to heat the liquid fuel in the at least one capillary flow passage to a level sufficient to change at least a portion thereof from a liquid state to a vapor state and deliver a stream of substantially vaporized fuel from the outlet end of the at least one capillary flow passage, a combustion chamber in communication with the outlet end of the at least one capillary flow passage and a conversion device operable to convert heat released by combustion in the combustion chamber into electrical power, and a storage device electrically connected to the photovoltaic array and the conversion device for storing the electrical power produced by the photovoltaic array and the conversion device.

Also disclosed is a method of generating electrical power. The method includes the steps of converting solar radiation into electrical power through the use of a photovoltaic array, supplying liquid fuel to at least one capillary flow passage, causing a stream of substantially vaporized fuel to pass through an outlet of the at least one capillary flow passage by heating the liquid fuel in the at least one capillary flow passage, combusting the vaporized fuel in a combustion chamber, converting heat produced by combustion of the vaporized fuel in the combustion chamber into electrical power using a conversion device and storing electrical power generated in a storage device.

According to one preferred form, the capillary flow passage can include a capillary tube and the heat source can include a resistance-heating element, a section of the tube heated by passing electrical current therethrough. Further, in another preferred form, the conversion device includes a micro-turbine with electrical generator, a Stirling engine with electrical generator, a thermoelectric device or a thermophotovoltaic device that outputs up to about 5,000 watts of power. An igniter can be provided to ignite the vaporized fuel upon start-up of the apparatus. The fuel supply can be arranged to deliver pressurized liquid fuel to the flow passage at a pressure of preferably less than 100 psig, more preferably, less than 50 psig, even more preferably 10 psig, and most preferably less than 5 psig. The preferred form can be operated with low ignition energy upon start up of the apparatus since it can provide a stream of vaporized fuel which mixes with air and forms an aerosol in the combustion chamber having a mean droplet size of 25 µm or less, preferably 10 µm or less.

To address problems associated with the formation of deposits during the heating of liquid fuel, one preferred form provides a method and means for cleaning deposits formed during the operation of the apparatus.

BRIEF DESCRIPTION OF THE DRAWINGS

The invention will now be described in more detail with reference to preferred forms of the invention, given only by way of example, and with reference to the accompanying drawings, in which:

FIG. 7A is a side view of the embodiment of FIG. 7 shown with the moveable rod to clean deposits from a capillary flow passage fully engaged within the capillary flow passage;

DETAILED DESCRIPTION

Figure 1:
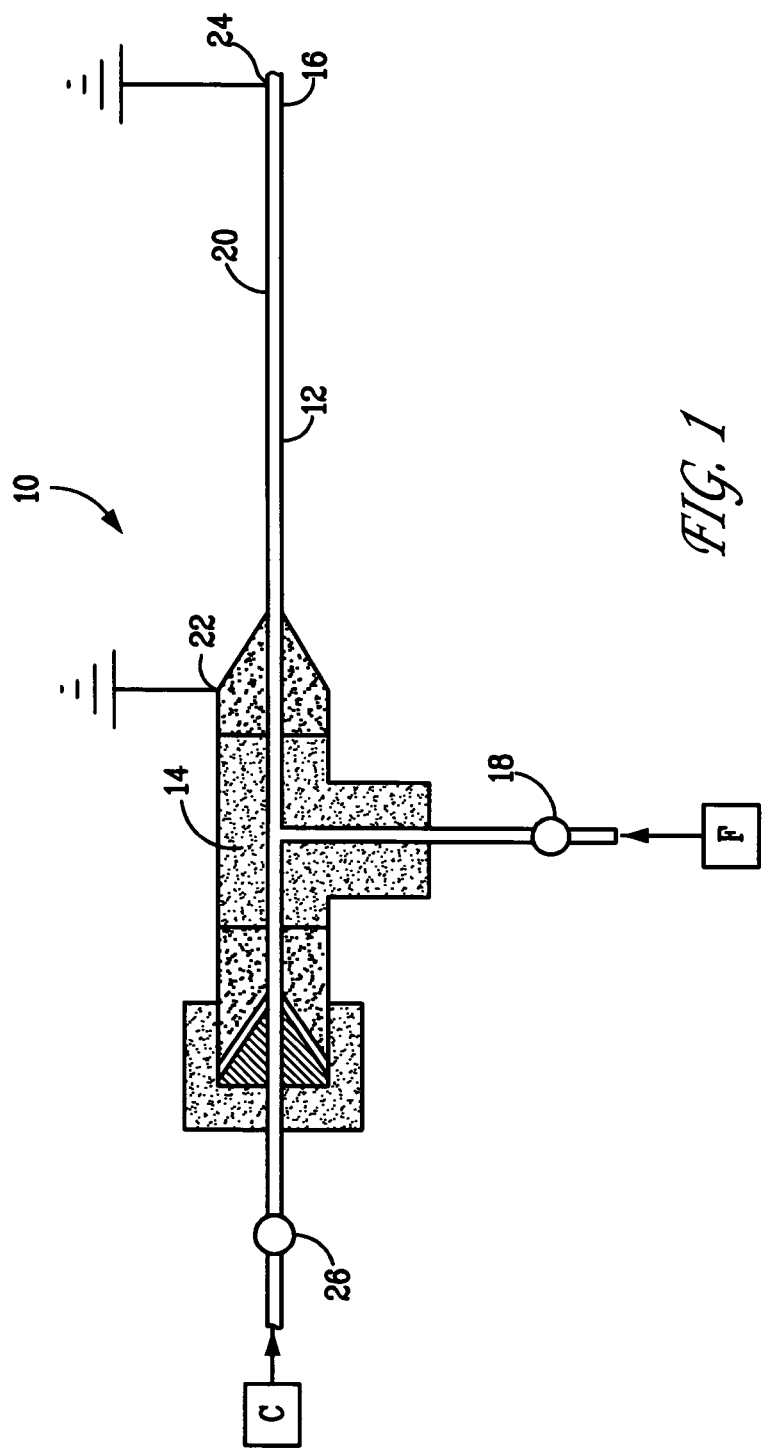
FIG. 1 presents a fuel-vaporizing device, in partial cross section, which includes a capillary flow passage in accordance with an embodiment of the invention.

Reference is now made to the embodiments illustrated in FIGS. 1-10 wherein like numerals are used to designate like parts throughout.

The present invention provides a power producing apparatus which advantageously combusts a high energy density liquid fuel. In a preferred embodiment, the apparatus includes at least one capillary sized flow passage connected to the fuel supply, a heat source arranged along the flow passage to heat liquid fuel in the flow passage sufficiently to deliver a stream of vaporized fuel from an outlet of the flow passage, a combustion chamber in which the vaporized fuel is combusted, and a conversion device which converts heat produced by combustion in the combustion chamber into mechanical and/or electrical power. The use of heated capillaries in connection with a combustion chamber and power conversion device is disclosed in U.S. patent application Ser. No. 10/143,463, filed by Pellizzari on May 10, 2002, entitled "Method and Apparatus for Generating Power By Combustion of Vaporized Fuel" having common inventorship with the present invention and assigned to the assignee of the present invention and incorporated herein by reference.

The flow passage can be a capillary tube heated by a resistance heater, a section of the tube heated by passing electrical current therethrough. The capillary flow passage also is characterized by having a low thermal inertia, so that the capillary passageway can be brought up to the desired temperature for vaporizing fuel very quickly, e.g., within 2.0 seconds, preferably within 0.5 second, and more preferably within 0.1 second. The capillary sized fluid passage is preferably formed in a capillary body such as a single or multilayer metal, ceramic or glass body. The passage has an enclosed volume opening to an inlet and an outlet either of which may be open to the exterior of the capillary body or may be connected to another passage within the same body or another body or to fittings. The heater can be formed by a portion of the body such as a section of a stainless steel tube or the heater can be a discrete layer or wire of resistance heating material incorporated in or on the capillary body.

The fluid passage may be any shape comprising an enclosed volume opening to an inlet and an outlet and through which a fluid may pass. The fluid passage may have any desired cross-section with a preferred cross-section being a circle of uniform diameter. Other capillary fluid passage cross-sections include non-circular shapes such as triangular, square, rectangular, oval or other shape and the cross section of the fluid passage need not be uniform. The fluid passage can extend rectilinearly or non-rectilinearly and may be a single fluid passage or multi-path fluid passage.

A capillary-sized flow passage can be provided with a hydraulic diameter that is preferably less than 2 mm, more preferably less than 1 mm, and most preferably less than 0.5 mm. The "hydraulic diameter" is a parameter used in calculating fluid flow characteristics through a fluid carrying element and is defined as four times the flow area of the fluid-carrying element divided by the perimeter of the solid boundary in contact with the fluid (generally referred to as the "wetted" perimeter). For a tube having a circular flow passage the hydraulic diameter and the actual diameter are equivalent. In the case where the capillary passage is defined by a metal capillary tube, the tube can have an inner diameter of 0.01 to 3 mm, preferably 0.1 to 1 mm, most preferably 0.15 to 0.5 mm. Alternatively, the capillary passage can be defined by transverse cross sectional area of the passage that can be $8 \times 10^{-5}$ to 7 mm$^2$, preferably $8 \times 10^{-3}$ to $8 \times 10^{-1}$ mm$^2$ and more preferably $2 \times 10^{-3}$ to $2 \times 10^{-1}$ mm$^2$. Many combinations of a single or multiple capillaries, various pressures, various capillary lengths, amounts of heat applied to the capillary, and different shapes and/or cross-sectional areas will suit a given application.

The conversion device can be a Stirling engine, microturbine or other suitable device for converting heat to mechanical or electrical power with an optional generator capable of producing up to about 5,000 watts of power. The liquid fuel can be any type of hydrocarbon fuel such as jet fuel, gasoline, kerosene or diesel oil, an oxygenate such as ethanol, methanol, methyl tertiary butyl ether, or blends of any of these and the fuel is preferably supplied to the flow passage at pressures of preferably less than 100 psig, more preferably less than 50 psig, even more preferably less than 10 psig, and most preferably less than 5 psig. The vaporized fuel can be mixed with air to form an aerosol having a mean droplet size of 25 μm or less, preferably 10 μm or less, thus allowing clean and efficient ignition capabilities.

According to a preferred embodiment of the invention, liquid fuel is delivered via a heated capillary tube (e.g., a small diameter glass, ceramic or metallic material such as stainless steel tube having an inner diameter of 3 mm or less) to a combustion chamber in which the vaporized fuel is mixed with preheated or unheated air. The vaporized fuel can be mixed with air at ambient temperature, which is drawn into air supply passages leading into the combustion chamber. Alternatively, the vaporized fuel can be mixed with air that has been preheated such as by a heat exchanger that preheats the air with heat of exhaust gases removed from the combustion chamber. If desired, the air can be pressurized such as by a blower prior to mixing with the vaporized fuel.

During vaporization of liquid fuel in a heated capillary passage, deposits of carbon and/or heavy hydrocarbons may accumulate on the capillary walls and flow of the fuel can be severely restricted which ultimately can lead to clogging of the capillary flow passage. The rate at which these deposits accumulate is a function of capillary wall temperature, the fuel flow rate and the fuel type. While it is thought that fuel additives may be useful in reducing such deposits, should clogging develop, the fuel vaporizing device of the present invention advantageously provides a means for cleaning deposits formed during operation.

In accordance with the present invention, the air-fuel mixture is combusted in a combustion chamber to produce heat that is converted into mechanical or electrical power. The power-producing device provides reliable liquid fuel delivery and atomization of vaporized fuel prior to combustion.

The heated capillary flow passage has the ability to form an aerosol of small fuel droplets (e.g., 25 μm or less, preferably 10 μm or less) when the vaporized fuel mixes with air at ambient temperature, operating at liquid fuel pressures below 100 psig, preferably less than 50 psig, more preferably less than 10 psig, and even more preferably less than 5 psig. The present invention possesses the ability to combust fuel at low air supply pressure (e.g., below 2 inch $H_2O$), starts rapidly, provides for control of fouling, clogging and gumming, operates at reduced levels of exhaust emissions and requires low ignition energy to ignite the fuel-air mixture.

One advantage of the apparatus according to the invention is its ignition energy requirement characteristics. Minimum ignition energy is a term used to describe the ease with which an atomized fuel/air mixture can be ignited, typically with an igniter such as a spark ignition source. The device according to the invention can provide vaporized fuel and/or aerosol with droplets having a Sauter Mean Diameter (SMD) of less than 25 μm, preferably less than 10 μm and more preferably less than 5 μm, such fine aerosols being useful to improve the start-up characteristics and flame stability in gas turbine applications. Additionally, very significant reductions in minimum ignition energy can be achieved for fuels having values of SMD at or below 25 μm. For example, as discussed in Lefebvre, Gas Turbine Combustion (Hemisphere Publishing Corporation, 1983) at page 252, $E_{min}$, a term that correlates the ease with which an atomized fuel/air mixture may be ignited, is shown to sharply decrease as SMD decreases. Minimum ignition energy is roughly proportional to the cube of the Sauter Mean Diameter (SMD) of the fuel droplets in the aerosol. SMD is the diameter of a droplet whose surface-to-volume ratio is equal to that of the entire spray and relates to the mass transfer characteristics of the spray. The relationship between $E_{min}$ and SMD for various fuels is shown in Lefebvre to be roughly approximated by the following relationship:

$$\log E_{min} = 4.5(\log SMD) + k; \text{ where}$$

$E_{min}$ is measured in mJoules,
SMD is measured in μm, and
k is a constant related to fuel type.

According to Lefebvre, heavy fuel oil has a minimum ignition energy of about 800 mJ at a SMD of 115 μm and a minimum ignition energy of about 23 mJ at a SMD of 50 μm. Isooctane has a minimum ignition energy of about 9 mJ at a SMD of 90 μm and a minimum ignition energy of about 0.4 mJ at a SMD of 40 μm. For a diesel fuel, when SMD is equal to 100 μm, $E_{min}$ is about 100 mJ. A reduction in SMD to 30 μm would yield a reduction in $E_{min}$ to about 0.8 mJ. As may be appreciated, ignition system requirements are substantially reduced for SMD values below 25 μm.

The power conversion apparatus according to the present invention has been found to exhibit highly desirable low ignition energy requirements. A low ignition energy requirement improves the power producing benefits of the present invention by reducing the weight of the overall system and maximizing the power output through the reduction of the parasitic power losses associated with the ignition system.

In view of the benefits hereinabove described, low energy spark ignition devices are preferred for the igniter of the power producing apparatus. Preferred are small piezo-electric ignition devices capable of providing a spark energy in the range of about 5 to 7 millijoules (mJ). Such devices are known to be simple, compact and present no parasitic load issues. The ultra-fine fuel vaporization provided by the apparatus of the invention cooperates to provide excellent ignition characteristics with low energy piezo-electric ignition devices.

The emissions characteristics of liquid-fueled combustion devices are known to be sensitive to the quality of the fuel droplet size distribution. High quality, fine sprays promote fuel evaporation and enhance mixing, thereby reducing the need for fuel-rich combustion and the often-attendant generation of smoke and soot. Small droplets follow flow streamlines and are less prone to impact against burner walls. Conversely, large droplets can impact burner walls and cause CO and hydrocarbon emissions and carbon deposits. This problem is more noticeable in devices where the flames are highly confined.

The heat produced during combustion of the vaporized fuel can be converted to electrical or mechanical power. For instance, the heat could be converted to any desired amount of electrical or mechanical power, e.g., up to 5000 watts of electrical power or mechanical power. Compared to portable battery technology which can only provide approximately 20 W for a few hours or a noisy, high emissions, internal combustion engine/generator producing above 1 kW, the apparatus according to one preferred embodiment of the invention offers a quiet, clean power source in the few hundred watt range.

Various technologies exist for conversion of heat produced in the combustion chamber according to the invention into electrical or mechanical power. For instance, in the 20 to 5000 watt range, at least the following technologies are contemplated: Stirling engines for conversion of heat into mechanical power which can be used to drive a generator, micro-gas turbines which can be used to drive a generator, thermoelectric for direct conversion of heat into electricity, and thermophotovoltaics for direct conversion of radiant energy into electricity.

The thermoelectric devices offer advantages in terms of being quiet and durable, and coupled with external combustion systems, offer the potential for low emissions and flexibility as to fuel. Various types of thermoelectric generators, which can be used as the conversion device, include those disclosed in U.S. Pat. Nos. 5,563,368; 5,793,119; 5,917,144; and 6,172,427, the disclosures of which are hereby incorporated by reference.

The thermophotovoltaic devices offer advantages in terms of being quiet, providing moderate power density, and coupled with external combustion systems offer the potential for low emissions and flexibility as to fuel. Various types of thermophotovoltaic devices, which can be used as the conversion device, include those disclosed in U.S. Pat. Nos. 5,512,109; 5,753,050; 6,092,912; and 6,204,442, the disclosures of which are hereby incorporated by reference. As shown in U.S. Pat. No. 6,204,442, a heat radiating body can be used to absorb heat from combustion gases and heat radiated from the heat radiating body is directed to a photocell for conversion to electricity, thus protecting the photocell from direct exposure to the combustion gases.

Micro-gas turbines could be desirable in terms of high specific power. Microturbine devices, which can be used as the conversion device, include those disclosed in U.S. Pat. Nos. 5,836,150; 5,874,798; and 5,932,940, the disclosures of which are hereby incorporated by reference.

Stirling engines offer advantages with respect to size, quiet operation, durability, and coupled with external combustion systems offer the potential for low emissions and flexibility as to fuel. Stirling engines that can be used as the conversion device will be apparent to those skilled in the art.

Referring now to FIG. 1, a fuel-vaporizing device for use in the apparatus of the present invention is shown. Fuel vaporizing device 10, for vaporizing a liquid fuel drawn from a source of liquid fuel, includes a capillary flow passage 12, having an inlet end 14 and an outlet end 16. A fluid control valve 18 is provided for placing inlet end 14 of capillary flow passage 12 in fluid communication with a liquid fuel source F and introducing the liquid fuel in a substantially liquid state into capillary flow passage 12. As is preferred, fluid control valve 18 may be operated by a solenoid. A heat source 20 is arranged along capillary flow passage 12. As is most preferred, heat source 20 is provided by forming capillary flow passage 12 from a tube of electrically resistive material, a portion of capillary flow passage 12 forming a heater element when a source of electrical current is connected to the tube at connections 22 and 24 for delivering current therethrough. Heat source 20, as may be appreciated, is then operable to heat the liquid fuel in capillary flow passage 12 to a level sufficient to change at least a portion thereof from the liquid state to a vapor state and deliver a stream of substantially vaporized fuel from outlet end 16 of capillary flow passage 20. By substantially vaporized is meant that at least 50% of the liquid fuel is vaporized by the heat source, preferably at least 70%, and more preferably at least 80% of the liquid fuel is vaporized.

Fuel vaporizing device 10 also includes means for cleaning deposits formed during the operation of the apparatus of the present invention. The means for cleaning deposits shown in FIG. 1 includes fluid control valve 18, heat source 20 and an oxidizer control valve 26 for placing capillary flow passage 12 in fluid communication with a source of oxidizer C. As may be appreciated, the oxidizer control valve can be located at or near either end of capillary flow passage 12 or configured to be in fluid communication with either end of capillary flow passage 12. If the oxidizer control valve is located at or near the outlet end 16 of capillary flow passage 12, it then serves to place the source of oxidizer C in fluid communication with the outlet end 16 of capillary flow passage 12. In operation, heat source 20 is used to heat the oxidizer C in capillary flow passage 12 to a level sufficient to oxidize deposits formed during the heating of the liquid fuel F. In one embodiment, to switch from a fueling mode to a cleaning mode, the oxidizer control valve 26 is operable to alternate between the introduction of liquid fuel F and the introduction of oxidizer C into capillary flow passage 12 and enables the in-situ cleaning of capillary flow passage when the oxidizer is introduced into the at least one capillary flow passage.

One technique for oxidizing deposits includes passing air or steam through the capillary flow passage. As indicated, the capillary flow passage is preferably heated during the cleaning operation so that the oxidation process is initiated and nurtured until the deposits are consumed. To enhance this cleaning operation, a catalytic substance may be employed, either as a coating on, or as a component of, the capillary wall to reduce the temperature and/or time required for accomplishing the cleaning. For continuous operation of the fuel vaporizing device, more than one capillary flow passage can be used such that when a clogged condition is detected, such as by the use of a sensor, fuel flow can be diverted to another capillary flow passage and oxidant flow initiated through the clogged capillary flow passage to be cleaned. As an example, a capillary body can include a plurality of capillary flow passages therein and a valving arrangement can be provided to selectively supply liquid fuel or air to each flow passage.

Alternatively, fuel flow can be diverted from a capillary flow passage and oxidant flow initiated at preset intervals. Fuel delivery to a capillary flow passage can be effected by a controller. For example, the controller can activate fuel delivery for a preset time period and deactivate fuel delivery after the preset amount of time. The controller may also effect adjustment of the pressure of the liquid fuel and/or the amount of heat supplied to the capillary flow passage based on one or more sensed conditions. The sensed conditions may include inter alia: the fuel pressure, the capillary temperature or the air-fuel ratio. The controller may also control one or more capillary flow passages to clean deposits.

The cleaning technique may be applied to combustion devices having a single flow passage. However, if the combustion device is intermittently shut down during the cleaning operation, the energy supplied to the flow passage during cleaning would preferably be electrical. The time period between cleanings may either be fixed based upon experimentally determined clogging characteristics, or a sensing and control device may be employed to detect clogging and initiate the cleaning process as required. For example, a control device could detect the degree of clogging by sensing the fuel supply pressure to the capillary flow passage.

Figure 2:
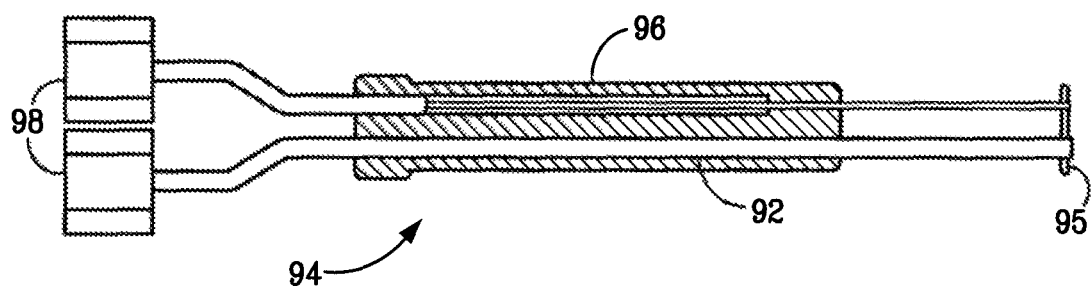
FIG. 2 shows a multi-capillary arrangement that can be used to implement the device and system of FIG. 4.
Figure 3:
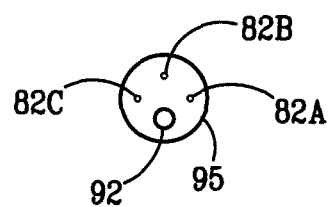
FIG. 3 shows an end view of the device shown in FIG. 2.

As indicated, the oxidation cleaning technique may also be applied to fuel vaporizing devices that are required to operate continuously. In this case, multiple capillary flow passages are employed. An exemplary multiple capillary flow passage fuel-vaporizing device for use in the present invention is illustrated in FIGS. 2 and 3. FIG. 2 presents a schematic view of a multiple capillary tube arrangement, integrated into a single assembly 94. FIG. 3 presents an end view of the assembly 94. As shown, the assembly can include the three capillary tubes 82A, 82B, 82C and a positive electrode 92 which can include a solid stainless steel rod. The tubes and the rod can be supported in a body 96 of electrically insulating material and power can be supplied to the rod and capillary tubes via fittings 98. For example, direct current can be supplied to upstream ends of one or more of the capillary tubes and a connection 95 at the downstream ends thereof can form a return path for the current through rod 92.

Figure 4:
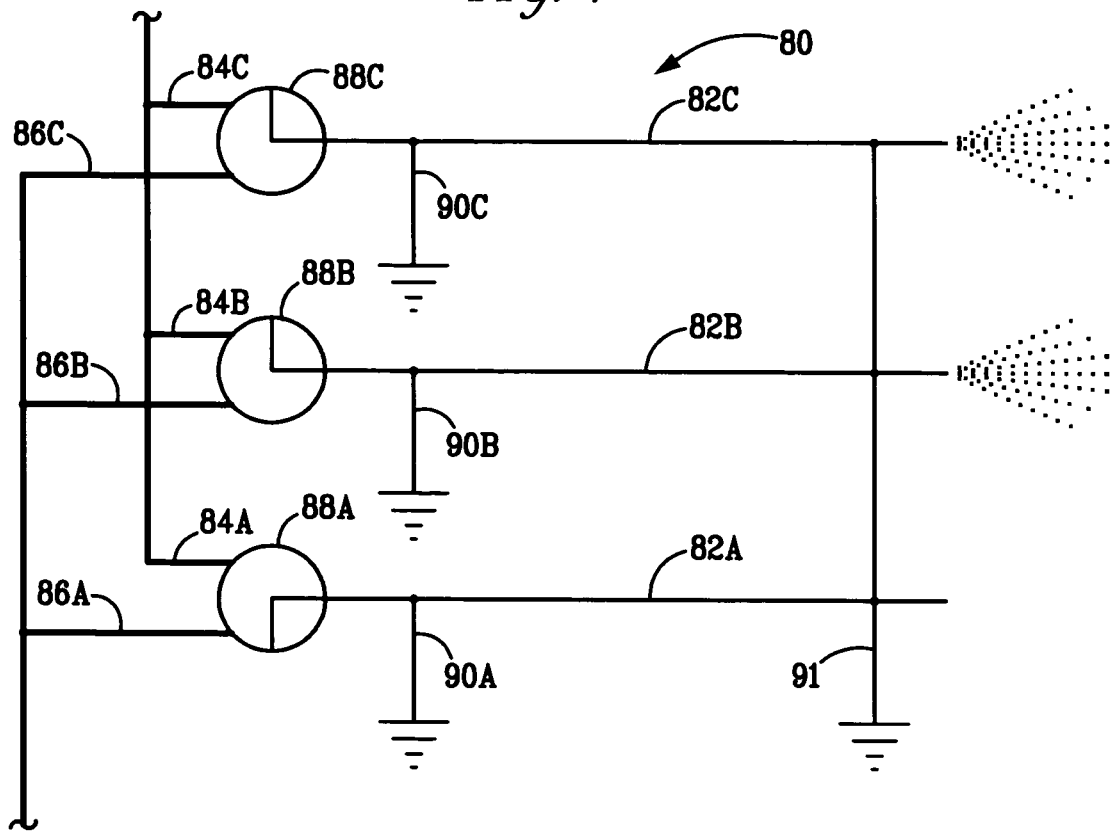
FIG. 4 shows details of a device that can be used to vaporize fuel and oxidize deposits in a multi-capillary arrangement to deliver substantially vaporized fuel for use in the practice of the present invention.

Reference is made now to FIG. 4, wherein a multiple capillary tube vaporizing system 80 for use in the practice of the present invention is shown. The system includes capillary tubes 82A through C, fuel supply lines 84A through C, oxidizer supply lines 86A through C, oxidizer control valves 88A through C, power input lines 90A-C and common ground 91. The system 80 allows cleaning of one or more capillary tubes while fuel delivery continues with one or more other capillary tubes. For example, combustion of fuel via capillary flow passages 82B and 82C can be carried out during cleaning of capillary flow passage 82A. Cleaning of capillary flow passage 82A can be accomplished by shutting off the supply of fuel to capillary tube 82A, supplying air to capillary flow passage 82A with sufficient heating to oxidize deposits in the capillary flow passage. Thus, the cleaning of one or several capillaries can be carried out while continuously delivering fuel. The one or more capillary flow passages being cleaned are preferably heated during the cleaning process by an electrical resistance heater or thermal feedback from the application. Again, the time period between cleanings for any given capillary flow passage may either be fixed based upon known clogging characteristics, determined experimentally, or a sensing and control system may be employed to detect deposit buildup and initiate the cleaning process as required.

Figure 5:
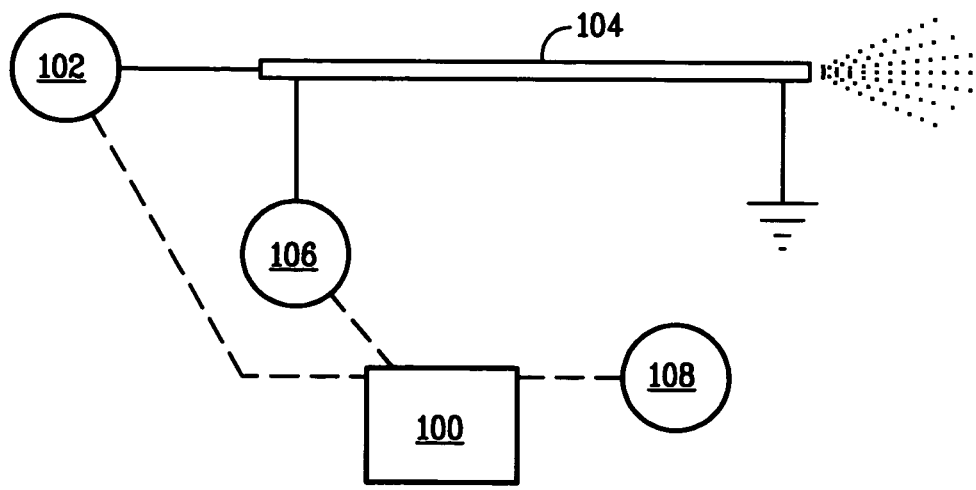
FIG. 5 shows a schematic of a control device to deliver fuel and optionally oxidizing gas to a capillary flow passage.

FIG. 5 shows an exemplary schematic of a control system to operate an apparatus in accordance with the present invention, the apparatus incorporating an oxidizing gas supply for cleaning clogged capillary passages. The control system includes a controller 100 operably connected to a fuel supply 102 that supplies fuel and optionally air to a flow passage such as a capillary flow passage 104. The controller is also operably connected to a power supply 106 that delivers power to a resistance heater or directly to a metal capillary flow passage 104 for heating the tube sufficiently to vaporize the fuel. If desired, the combustion system can include multiple flow passages and heaters operably connected to the controller 100. The controller 100 can be operably connected to one or more signal sending devices such as an on-off switch, thermocouple, fuel flow rate sensor, air flow rate sensor, power output sensor, battery charge sensor, etc. whereby the controller 100 can be programmed to automatically control operation of the combustion system in response to the signal(s) outputted to the controller by the signal sending devices 108.

In operation, the fuel vaporizing device of the apparatus according to the present invention can be configured to feed back heat produced during combustion such that the liquid fuel is heated sufficiently to substantially vaporize the liquid fuel as it passes through the capillary reducing or eliminating or supplementing the need to electrically or otherwise heat the capillary flow passage. For example, the capillary tube can be made longer to increase the surface area thereof for greater heat transfer, the capillary tube can be configured to pass through the combusting fuel or a heat exchanger can be arranged to use exhaust gas from the combustion reaction to preheat the fuel.

Figure 6:
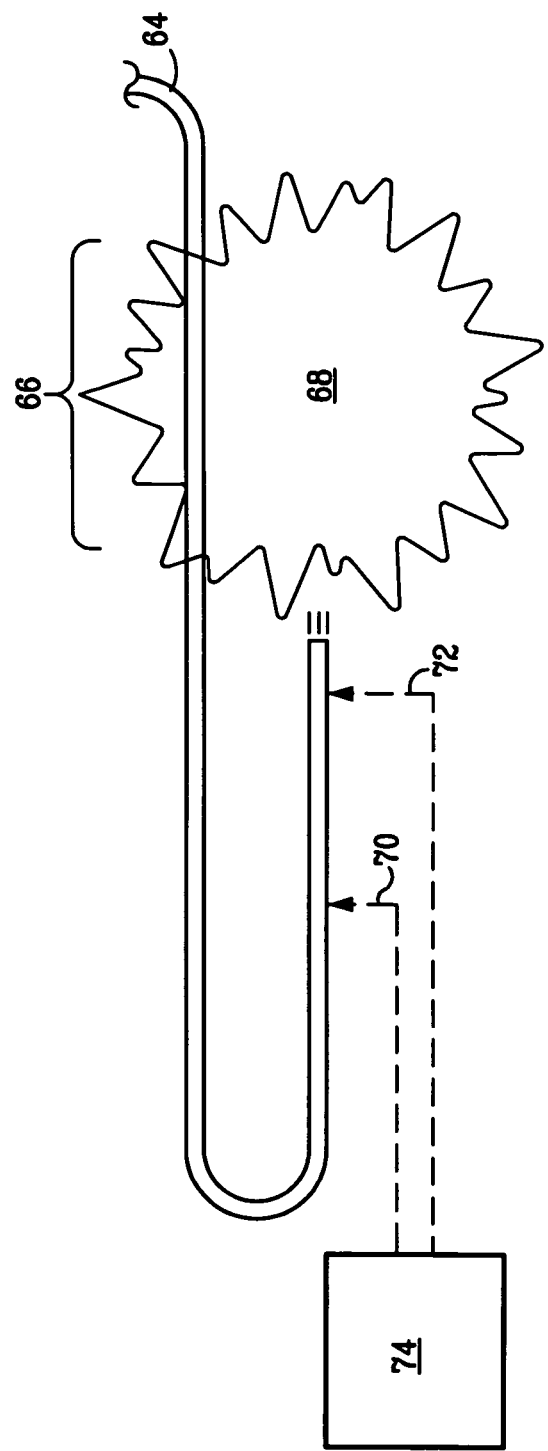
FIG. 6 shows a schematic of an arrangement for using combustion heat to preheat the liquid fuel.

FIG. 6 shows, in simplified form, how a capillary flow passage 64 can be arranged so that liquid fuel traveling therethrough can be heated to an elevated temperature to reduce the power requirements of the fuel-vaporizing heater. As shown, a portion 66 of a tube comprising the capillary flow passage passes through the flame 68 of the combusted fuel. For initial start up, a resistance heater comprising a section of the tube or separate resistance heater heated by electrical leads 70, 72 connected to a power source such as a battery 74 can be used to initially vaporize the liquid fuel. After ignition of the vaporized fuel by a suitable ignition arrangement, the portion 66 of the tube can be preheated by the heat of combustion to reduce the power otherwise needed for continued vaporization of the fuel by the resistance heater. Thus, by preheating the tube, the fuel in the tube can be vaporized without using the resistance heater whereby power can be conserved.

As will be appreciated, the fuel vaporizing device and attendant system depicted in FIGS. 1 through 6 may also be used in connection with another embodiment of the present invention. Referring again to FIG. 1, the means for cleaning deposits includes fluid control valve 18, a solvent control valve 26 for placing capillary flow passage 12 in fluid communication with a solvent, solvent control valve 26 disposed at one end of capillary flow passage 12. In one embodiment of the apparatus employing solvent cleaning, the solvent control valve is operable to alternate between the introduction of liquid fuel and the introduction of solvent into capillary flow passage 12, enabling the in-situ cleaning of capillary flow passage 12 when the solvent is introduced into capillary flow passage 12. While a wide variety of solvents have utility, the solvent may comprise liquid fuel from the liquid fuel source. When this is the case, no solvent control valve is required, as there is no need to alternate between fuel and solvent, and the heat source should be phased-out or deactivated during the cleaning of capillary flow passage 12.

Figure 7:
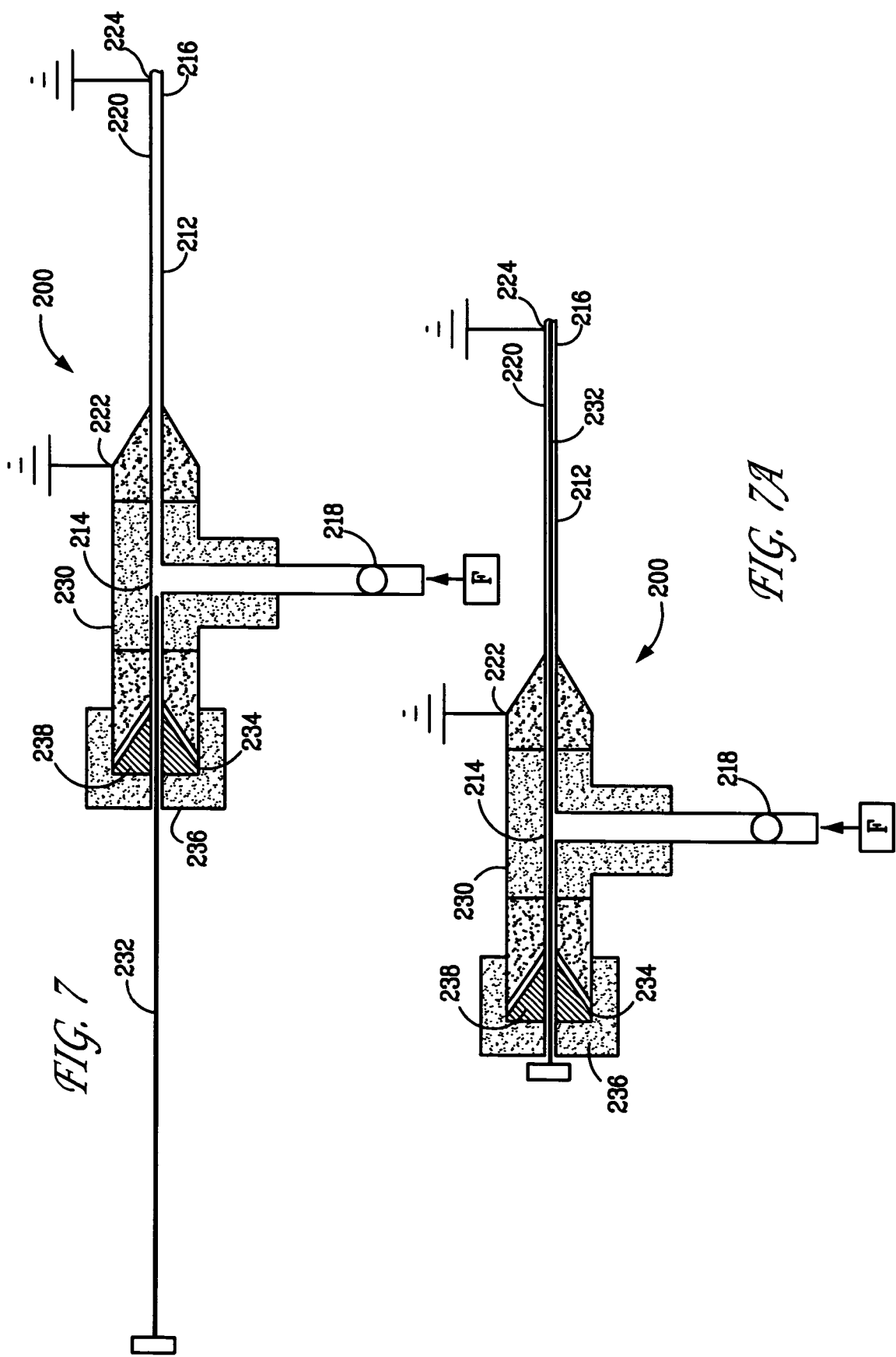
FIG. 7 is a side view of another embodiment of a fuel-vaporizing device employing a moveable rod to clean deposits from a capillary flow passage.

FIG. 7 presents another exemplary embodiment of the present invention. A fuel-vaporizing device 200 for use in the apparatus of the present invention has a heated capillary flow passage 212 for delivering liquid fuel F. Heat is provided by heat source 220, which is arranged along capillary flow passage 212. As is most preferred, heat source 220 is provided by forming capillary flow passage 212 from a tube of electrically resistive material, a portion of capillary flow passage 212 forming a heater element when a source of electrical current is connected to the tube at connections 222 and 224 for delivering current therethrough.

In order to clean deposits formed during operation of fuel vaporizing device 200, an axially moveable rod 232 is positioned through opening 236 of end cap 234 of device body 230 so as to be in axial alignment with the opening of inlet end 214 of capillary flow passage 212. Packing material 238 is provided within the interior volume of end cap 234 for sealing. Referring now to FIG. 7A, axial moveable rod 232 is shown fully extended within capillary flow passage 212. As may be appreciated, selecting the diameter of axial moveable rod 232 for minimal wall clearance within the interior of capillary flow passage 212 produces a combination capable of removing substantially all of the deposits built up along the interior surface of capillary flow passage 212 during the operation of fuel vaporizing device 200.

Figure 8:
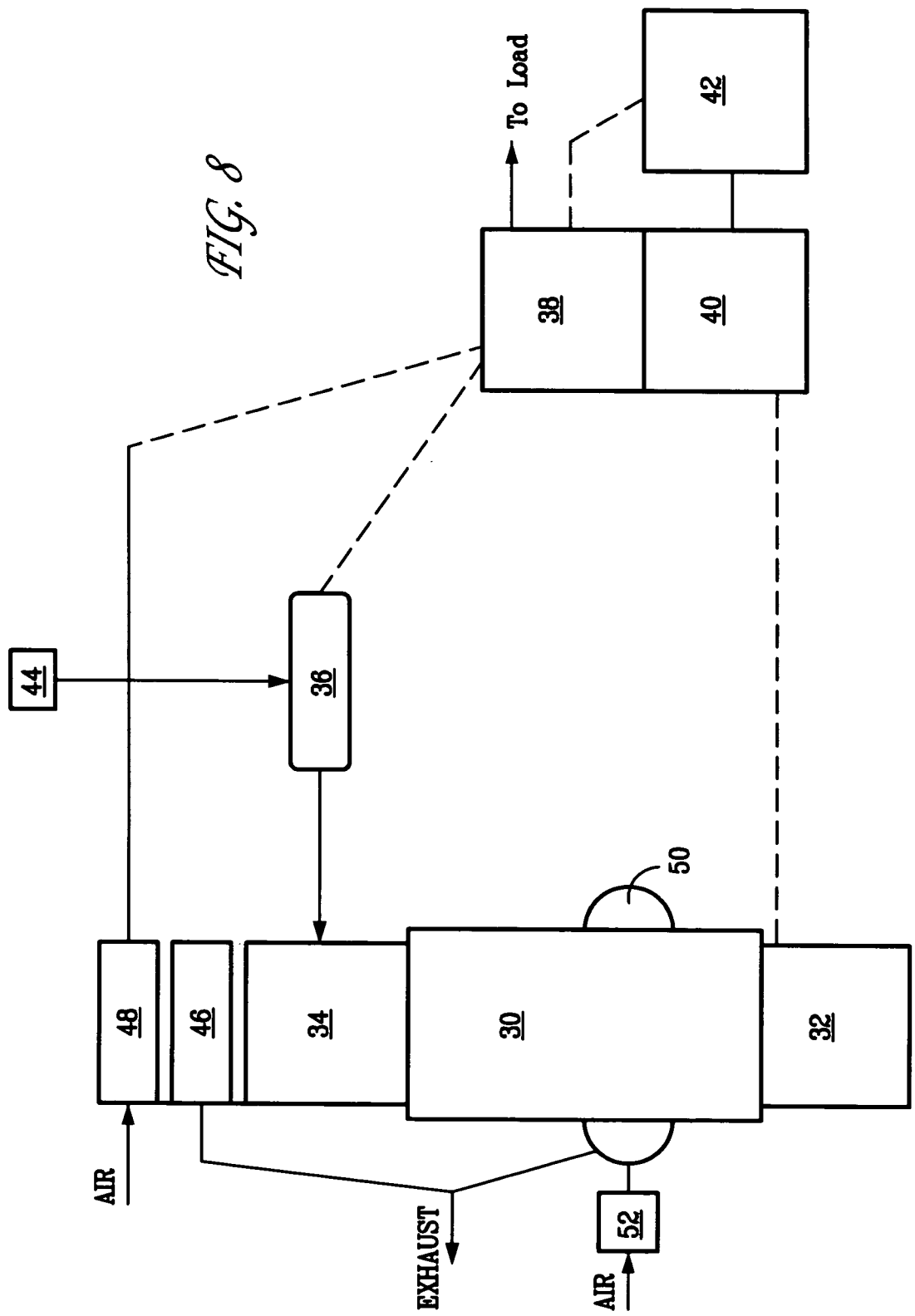
FIG. 8 is a schematic view of an apparatus for generating power in accordance with the invention wherein a Stirling engine is used to generate electricity in accordance with one embodiment of the invention.

FIG. 8 shows a schematic of an apparatus in accordance with the invention which includes a free-piston Stirling engine 30, a combustion chamber 34 wherein heat at 550-750° C. is converted into mechanical power by a reciprocating piston which drives an alternator 32 to produce electrical power. The assembly also includes a capillary flow passage/heater assembly 36, a controller 38, a rectifier/regulator 40, a battery 42, a fuel supply 44, a recuperator 46, a combustion blower 48, a cooler 50, and a cooler/blower 52. In operation, the controller 38 is operable to control delivery of fuel to the capillary 36 and to control combustion of the fuel in the chamber 34 such that the heat of combustion drives a piston in the Stirling engine such that the engine outputs electricity from the alternator 32. If desired, the Stirling engine/alternator can be replaced with a kinematic Stirling engine which outputs mechanical power. Examples of combustion chambers and air preheating arrangements can be found in U.S. Pat. Nos. 4,277,942, 4,352,269, 4,384,457 and 4,392,350, the disclosures of which are hereby incorporated by reference.

Figure 9:
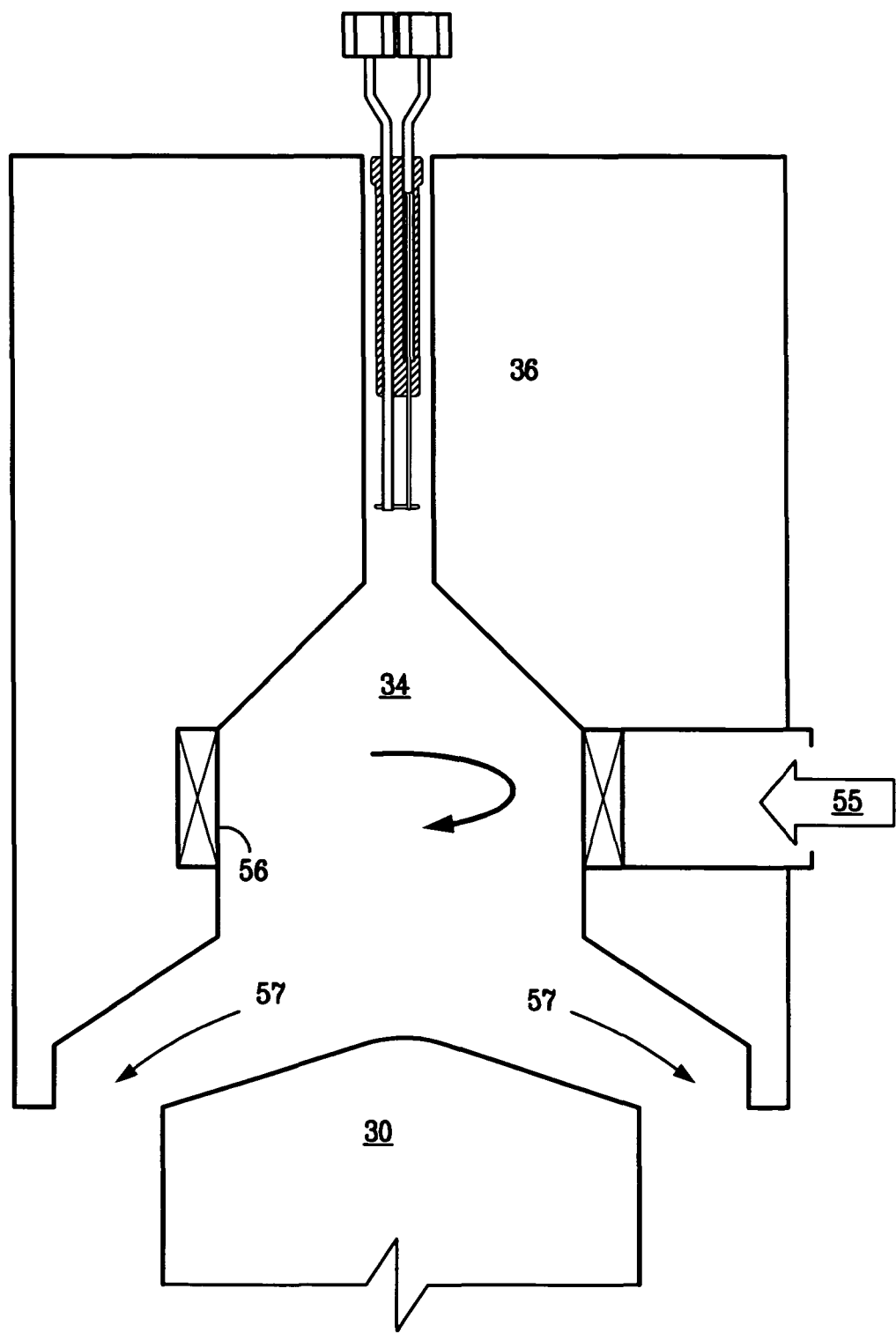
FIG. 9 shows a partial cross-sectional schematic view of a power-producing device in accordance with another embodiment of the invention.

FIG. 9 presents a partial cross-sectional schematic view of a power-producing device in accordance with another embodiment of the invention, which can form part of a heat conversion device such as a Stirling engine assembly. As shown in FIG. 9, air delivered to an air inlet by an air blower enters the combustion chamber 34 and mixes with vaporized fuel delivered to the chamber by the capillary/heater arrangement 36. Heat of combustion in the chamber 34 heats the end of the Stirling engine 30 and a sliding piston reciprocates within an alternator in a manner that generates electricity. The chamber 34 can be designed to allow the exhaust gases to preheat incoming air and thus lower the energy requirements for combusting the fuel. For instance, the housing can include a multiwall arrangement, which allows the incoming air to circulate in a plenum, which is heated by exhaust gases circulating in an exhaust passage. Inlet air (indicated by arrow 55) can be caused to swirl in the combustion chamber by passing the air through swirler vanes 56 around the combustion chamber 34. The combusted air-fuel mixture heats the heat conversion device (Stirling engine) 30 and exhaust gases (indicated by arrows 57) are removed from the combustion chamber.

In general, the power conversion apparatus could include a liquid fuel source, at least one flow passage (e.g., one or more heated capillary tubes) through which fuel from the fuel supply is vaporized and delivered to a combustion chamber wherein the vaporized fuel is combusted, and heat produced in the combustion chamber is used to drive a Stirling engine or other heat conversion device. A heat exchanger can be used to preheat air as the air travels through air passages in the heat exchanger thereby maximizing efficiency of the device, i.e., by preheating the air mixed with the vaporized fuel to support combustion in the chamber, less fuel is needed to maintain the Stirling engine at a desired operating temperature. The exhaust gas can travel through exhaust ducts in the heat exchanger whereby heat from the exhaust gas can be transferred to the air being delivered to the combustion chamber.

The combustion chamber can incorporate any suitable arrangement wherein air is mixed with the vaporized fuel and/or an air-fuel mixture is combusted. For example, the fuel can be mixed with air in a venturi to provide an air-fuel mixture and the air-fuel mixture can be combusted in a heat-generating zone downstream from the venturi. In order to initiate combustion, the air-fuel mixture can be confined in an ignition zone in which an igniter such as a spark generator ignites the mixture. The igniter can be any device capable of igniting the fuel such as a mechanical spark generator, an electrical spark generator, resistance heated ignition wire or the like. The electrical spark generator can be powered by any suitable power source, such as a small battery. However, the battery can be replaced with a manually operated piezoelectric transducer that generates an electric current when activated. With such an arrangement, current can be generated electro-mechanically due to compression of the transducer. For instance, a striker can be arranged so as to strike the transducer with a predetermined force when the trigger is depressed. The electricity generated by the transducer can be supplied to a spark generating mechanism by suitable circuitry. Such an arrangement could be used to ignite the fuel-air mixture.

Some of the electrical power generated by the conversion device can be stored in a suitable storage device such as a battery or capacitor, which can be used to power the igniter. For example, a manually operated switch can be used to deliver electrical current to a resistance-heating element or directly through a portion of a metal tube, which vaporizes fuel in the flow passage and/or the electrical current can be supplied to an igniter for initiating combustion of the fuel-air mixture delivered to the combustion chamber.

If desired, the heat generated by combusting the fuel could be used to operate any types of devices that rely on mechanical or electrical power. For instance, a heat conversion source could be used to generate electricity for portable electrical equipment such as telephone communication devices (e.g., wireless phones), portable computers, power tools, appliances, camping equipment, military equipment, transportation equipment such as mopeds, powered wheelchairs and marine propulsion devices, electronic sensing devices, electronic monitoring equipment, battery chargers, lighting equipment, heating equipment, etc. The heat conversion device could also be used to supply power to non-portable devices or to locations where access to an electrical power grid is not available, inconvenient or unreliable. Such locations and/or non-portable devices include remote living quarters and military encampments, vending machines, marine equipment, etc.

Contemplated photovoltaic arrays for use in the hybrid power generating systems of the present invention include a wide variety of photovoltaic cells. Examples of preferred types known to be available can provide 20-25% conversion efficiency and may include several conversion layers. For example, a blue-responsive layer on an outermost surface, then a green-red responsive layer, and then an infrared layer. Other types are made with gallium rather than silicon. Nevertheless, in certain circumstances, it may be more economic to use a relatively inefficient (10-18%) cell, wherein the semiconducting surface of a cell is preferably provided with an adequate amount (in terms of cross-sectional area) of conductive metallic strips so that the generated current, which may be several times greater than that envisaged by its manufacturers, does not cause overheating of the semiconductor or even melting of metal conductors.

Alternatively, dedicated designs of solar cells may comprise an amorphous type comprising layered amorphous silicon constructed on a planar or non-planar surface, as those skilled in the art will understand. Developments in the construction of these cells can allow cell material to be evaporated or sprayed onto any surface to form a conforming coating.

A variety of methods for producing photovoltaic cells and photovoltaic arrays are known, as evidenced by U.S. Pat. Nos. 4,152,824; 4,239,555; 4,451,969; 4,595,790; 4,851,308; 6,077,722; 6,111,189; 6,368,892; 6,423,565; and 6,465,724, the contents of which are hereby incorporated by reference.

As is common in the art of power generation using photovoltaic cells, means to balance out loading may be provided if, for example, a part of the array is in a relatively poorly illuminated position. A useful operating voltage is at least 12 volts, with higher voltages providing enhanced utility from the standpoint of minimizing transmission losses and semiconductor losses, particularly when the sunlight is weak and the actual voltage drops. A step-up converter may be provided as is known in the art, to maintain a constant output voltage though at varying currents. Typically, an array used in combination with this invention may produce in the range of 500 watts to 2 kilowatts or more of electricity.

Figure 10:
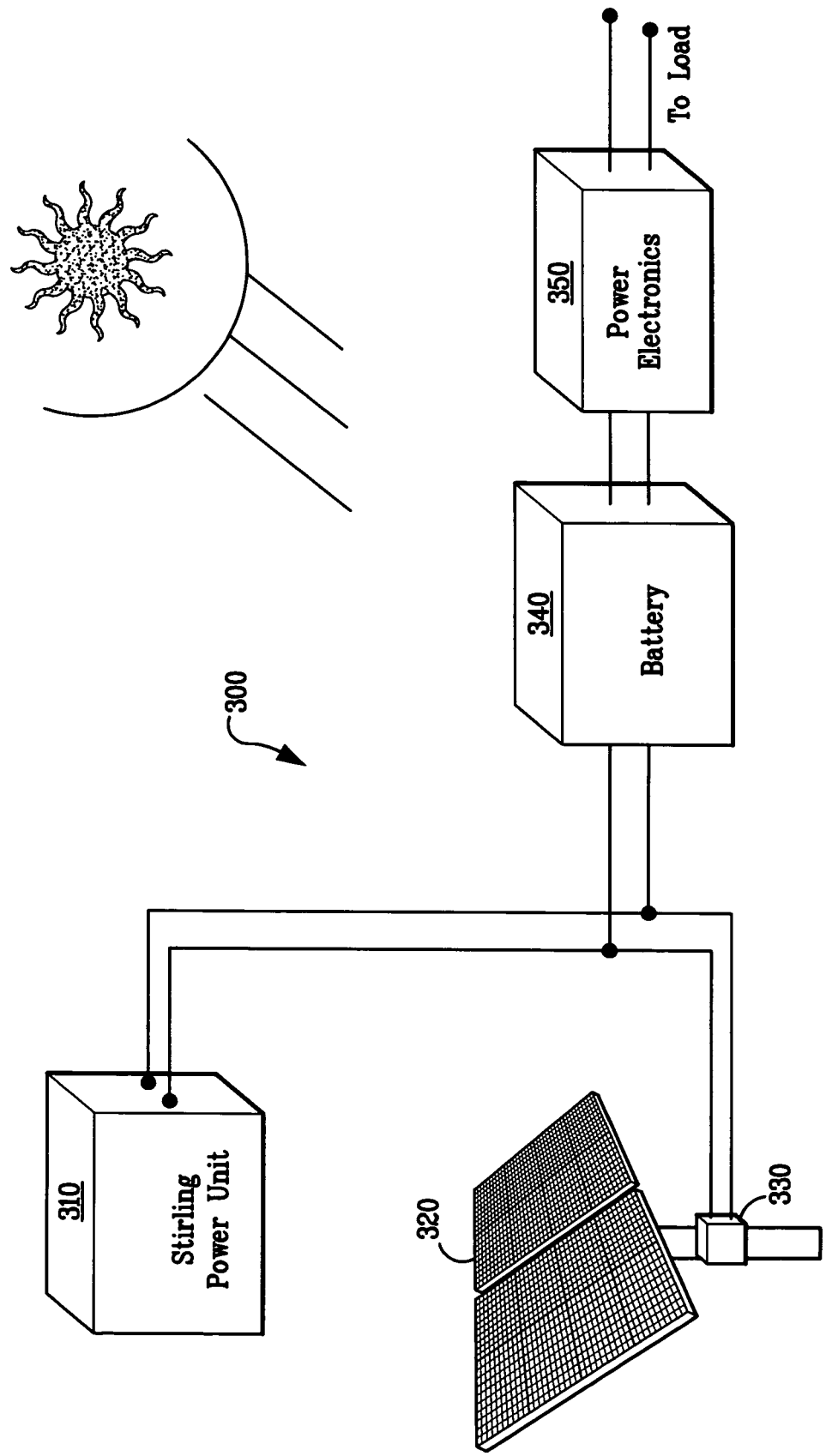
FIG. 10 is a block diagram of a hybrid power system in accordance with the present invention.

Referring now to FIG. 10, a block diagram of a hybrid power system 300 in accordance with a preferred form is shown. As shown, a power unit 310 is provided which includes a liquid fuel source, one or more heated capillary tubes through which fuel from a fuel supply is vaporized and delivered to a combustion chamber wherein the vaporized fuel is combusted, and heat produced during combustion chamber is used to drive a Stirling engine or other heat conversion device, as previously described. The heat conversion device may be advantageously attached to an alternator, such as a linear alternator for the production of electrical power and sent to storage battery 340 that feeds power electronics module 350, which, in turn, is connected to a load.

Photovoltaic array 320, which may be selected from the types previously described, is also electrically connected to storage battery 340 and may be sized to provide the total requirements of the load during periods of peak solar radiation or may be designed for supplementation by power unit 310. With respect to the sizing of the power unit 310, a unit having an engine with a 350-watt capacity would provide a similar power output over 12 hours per day as a 1-kilowatt photovoltaic array provides on a sunny day. As such, the capacity of the power unit can be considerably lower than that of the PV array and still provide dispatch capability and power reliability enhancement. As may be appreciated multiple power units could be used simultaneously to address larger applications.

As is particularly preferred, photovoltaic array 320 provides about 90% of delivered electricity, yielding a hybrid strategy that requires about 300 to 800 hours annually of engine operation. The hybrid architecture of the present invention can reduce the need for photovoltaic panel and battery storage capacity by 25% to 50% and can reduce capital and ownership costs as compared to photovoltaic arrays. Additionally, the hybrid architecture contemplated reduces stress on the battery subsystem (reduced levels of discharge, etc.) with resultant increases in replacement schedules of a factor of two or more.

While the invention has been described in detail with reference to preferred embodiments thereof, it will be apparent to one skilled in the art that various changes can be made, and equivalents employed, without departing from the scope of the invention.

What is claimed is:

1. A hybrid system for generating electrical power comprising:

(a) a photovoltaic array for collecting and converting solar radiation into electrical power;

(b) an apparatus for producing power from a source of liquid fuel, the apparatus comprising (i) at least one capillary flow passage defined by a metal capillary tube having an inner diameter of from 0.1 to 1 mm, said at least one capillary flow passage having an inlet end and an outlet end, said inlet end in fluid communication with the source of liquid fuel; (ii) an electrical resistance heat source arranged along said at least one capillary flow passage, said heat source operable to heat the liquid fuel in said at least one capillary flow passage to a level sufficient to change from a liquid state to a vapor state and deliver a stream of substantially vaporized fuel from said outlet end of said at least one capillary flow passage; (iii) means for cleaning deposits formed within said at least one capillary flow passage during operation of the apparatus, said means for cleaning deposits operable for placing said at least one capillary flow passage in fluid communication with a solvent, enabling in-situ cleaning of said capillary flow passage when the solvent is introduced into said at least one capillary flow passage, wherein the solvent comprises liquid fuel from the liquid fuel source and wherein the heat source is phased-out during cleaning of said capillary flow passage; (iv) a combustion chamber in communication with said outlet end of said at least one capillary flow passage, said combustion chamber configured to allow exhaust gases to preheat inlet air to reduce the energy required to combust the vaporized fuel; (v) swirl vanes for causing inlet air to swirl in the combustion chamber; and (vi) a conversion device operable to convert heat released by combustion in said combustion chamber into electrical power, said conversion device outputs up to 5000 watts of electrical power and comprises a Stirling engine with linear alternator for the production of electrical power;

(c) a storage device electrically connected to said photovoltaic array and said conversion device for storing the electrical power produced by said photovoltaic array and said conversion device;

(d) a controller for controlling said heat source to vaporize the liquid fuel to a level effective to reduce ignition energy requirement to a minimum of about 0.8 mJ; and (e) a piezo-electric ignition device for providing a spark energy in the range of about 5 to 7 mJ;

wherein at least a portion of said at least one capillary flow passage is arranged to be heated by the combusted fuel such that the fuel in said at least one capillary flow passage is vaporized;

wherein the electrical resistance heater is only used for an initial start-up period and heat from combusted fuel is used to vaporize the liquid fuel thereafter; and wherein the photovoltaic array is sized to provide about 90% of delivered electricity at about 300 to 800 hours of engine operation annually.

2. The hybrid system of claim 1, wherein said heat source comprises a resistance-heating element.

3. The hybrid system of claim 1, further comprising a fluid control valve, which controls the flow of liquid fuel from the liquid fuel source.

4. The hybrid system of claim 3, wherein said at least one capillary flow passage comprises at least one capillary tube.

5. The hybrid system of claim 4, wherein said heat source comprises a section of said capillary tube heated by passing an electrical current therethrough.

6. The hybrid system of claim 1, wherein said combustion chamber includes an igniter operable to ignite the vaporized fuel.

7. The hybrid system of claim 1, further comprising a fuel source, said fuel source capable of delivering pressurized liquid fuel to said at least one capillary flow passage at a pressure of 100 psig or less.

8. The hybrid system of claim 1, wherein said heat source enables the stream of substantially vaporized fuel that mixes with a gas upon exiting said outlet end of said at least one capillary flow passage to form an aerosol having a particle size distribution, a fraction of which is 25 µm or less.

9. The hybrid system of claim 1, further comprising a heat exchanger which includes an exhaust duct through which a portion of the exhaust gases exhausted from said combustion chamber are circulated and an air passage through which air is circulated, said heat exchanger preheating the air in said air passage by transferring heat from the exhaust gases in said exhaust duct to the air.

10. The hybrid system of claim 1, further comprising an air blower, said air blower supplying air under pressure to said combustion chamber to enable the pressurized air to mix with the vaporized fuel in a desired air-to-fuel ratio effective to combust the air-fuel mixture.

11. The hybrid system of claim 1, wherein the fuel source includes a fuel pump and a regulation valve, said regulation valve supplying the liquid fuel to the capillary flow passage at a desired flow rate.

12. A method of generating electrical power, comprising;

(a) converting solar radiation into electrical power through the use of a photovoltaic array;

(b) supplying liquid fuel to at least one capillary flow passage;

(c) causing a stream of substantially vaporized fuel to pass through an outlet of the at least one capillary flow passage defined by a metal capillary tube having an inner diameter of from 0.1 to 1 mm by heating the liquid fuel in the at least one capillary flow passage to vaporize the liquid fuel to a level effective to reduce ignition energy requirement to a minimum of about 0.8 mJ;

(d) causing inlet air to swirl in a combustion chamber; the combustion chamber configured to allow exhaust gases to preheat the inlet air to reduce the energy required to combust the vaporized fuel;

(e) igniting the vaporized fuel to initiate combustion through the use of a piezo-electric ignition device for providing a spark energy in the range of about 5 to 7 mJ;

(f) combusting the vaporized fuel in the combustion chamber;

(g) converting heat produced by combustion of the vaporized fuel in the combustion chamber into electrical power using a conversion device the conversion device outputs up to 5000 watts of electrical power and comprises a Stirling engine with linear alternator for the production of electrical power;

(h) storing electrical power generated in steps (a) and (g) in a storage device; and (i) cleaning periodically deposits formed within the at least one capillary flow passage during operation, wherein said periodic cleaning step comprises (i) phasing-out said heating of the at least one capillary flow passage, and (ii) supplying a solvent to the at least one capillary flow passage, whereby deposits formed in the at least one capillary flow passage are removed, wherein the liquid fuel is heated by an electrical resistance heater and liquid fuel in a portion of the capillary flow passage is heated with heat produced by the combusted fuel;

wherein the electrical resistance heater is only used for an initial start-up period and the heat from the combusted fuel is used to vaporize the liquid fuel thereafter; and wherein the photovoltaic array is sized to provide about 90% of delivered electricity at about 300 to 800 hours of engine operation annually.

13. The method of claim 12, wherein the at least one capillary flow passage includes at least one capillary tube and the heat source comprises a resistance heating element or section of the capillary tube heated by passing an electrical current therethrough, the method further including flowing the liquid fuel through the capillary tube and vaporizing the liquid fuel by heating the tube.

14. The method of claim 12, wherein the combustion chamber includes an igniter arranged to ignite the vaporized fuel, the method including igniting the vaporized fuel with the igniter.

15. The method of claim 12, wherein the fuel supply delivers pressurized liquid fuel to the at least one capillary flow passage, the method including delivering pressurized hydrocarbon fuel, oxygenated fuel or mixtures thereof, at a pressure of 100 psig or less to the at least one capillary flow passage.

16. The method of claim 12, wherein the stream of vaporized fuel mixes with air and forms a precombustion aerosol in the combustion chamber prior to start up of combustion, the method including forming the precombustion aerosol having a particle size distribution, a fraction of which is 25 µm or less prior to igniting the vaporized fuel to initiate combustion.

17. The method of claim 2, further comprising preheating air in a heat exchanger which includes an exhaust duct through which exhaust gases removed from the combustion chamber are circulated and an air passage through which air is circulated, the heat exchanger preheating the air in the air passage by transferring heat from the exhaust gases in the exhaust duct to the air.

18. The method of claim 12, further comprising supplying air under pressure to the combustion chamber such that the pressurized air mixes with the vaporized fuel in a desired air-to-fuel ratio suitable for combustion of the air-fuel mixture.

19. The method of claim 12, further comprising preheating the liquid fuel with a heat exchanger which includes an exhaust duct through which exhaust gases removed from the combustion chamber are circulated and a fuel passage through which the liquid fuel is circulated, the heat exchanger preheating the liquid fuel in the fuel passage by transferring heat from the exhaust gases in the exhaust duct to the liquid fuel.

20. The method of claim 12, wherein the solvent includes liquid fuel from the liquid fuel source.

* * * * *